(12) United States Patent
Ishibashi et al.

(10) Patent No.: US 8,989,339 B2
(45) Date of Patent: Mar. 24, 2015

(54) ZIRCONIUM ALLOY MATERIAL

(75) Inventors: Ryo Ishibashi, Tokai (JP); Masahisa Inagaki, Hitachi (JP); Hideo Soneda, Hitachi (JP); Naoya Okizaki, Hitachi (JP); Tomomi Nakamura, Hitachinaka (JP); Yoshikazu Todaka, Toyohashi (JP); Hiroaki Azuma, Nagoya (JP); Nozomu Adachi, Toyohashi (JP); Minoru Umemoto, Toyohashi (JP)

(73) Assignee: Hitachi, Ltd., Tokyo (JP)

( * ) Notice: Subject to any disclaimer, the term of this patent is extended or adjusted under 35 U.S.C. 154(b) by 509 days.

(21) Appl. No.: 13/291,277

(22) Filed: Nov. 8, 2011

(65) Prior Publication Data

US 2012/0114091 A1    May 10, 2012

(30) Foreign Application Priority Data

Nov. 8, 2010  (JP) .................................. 2010-249543

(51) Int. Cl.
| | |
|---|---|
| *C22C 16/00* | (2006.01) |
| *G21C 3/06* | (2006.01) |
| *G21C 3/32* | (2006.01) |
| *G21C 3/336* | (2006.01) |
| *G21C 3/07* | (2006.01) |
| *C22F 1/18* | (2006.01) |
| *G21C 3/324* | (2006.01) |
| *G21C 3/34* | (2006.01) |
| *G21C 21/00* | (2006.01) |
| *C21D 7/08* | (2006.01) |

(52) U.S. Cl.
CPC . *G21C 3/07* (2013.01); *C22C 16/00* (2013.01); *C22F 1/186* (2013.01); *G21C 3/324* (2013.01); *G21C 3/34* (2013.01); *C21D 7/08* (2013.01); *C21D 2221/10* (2013.01); *Y02E 30/40* (2013.01)

USPC ............. 376/414; 148/95; 148/559; 148/668; 420/422; 376/409; 376/412

(58) Field of Classification Search
CPC ................................ C22C 16/00; C22C 30/00
USPC ............ 420/422, 423; 148/421, 668, 95, 559, 148/400; 376/409, 412, 414–417
See application file for complete search history.

(56) References Cited

U.S. PATENT DOCUMENTS

| | | | | | |
|---|---|---|---|---|---|
| 4,584,030 | A | * | 4/1986 | McDonald et al. | ............ 148/421 |
| 4,649,023 | A | * | 3/1987 | Sabol et al. | .................... 420/422 |

(Continued)

FOREIGN PATENT DOCUMENTS

| | | | |
|---|---|---|---|
| DE | 1207096 | * | 12/1965 |
| JP | 61-272359 | | 12/1986 |

(Continued)

OTHER PUBLICATIONS

Japanese Official Action dated Feb. 18, 2014, for JP Application No. 2010-249543.

*Primary Examiner* — Bernarr Gregory
(74) *Attorney, Agent, or Firm* — Baker Botts L.L.P.

(57) ABSTRACT

Disclosed is a zirconium alloy material having high corrosion resistance regardless of thermal history during its manufacturing process. The zirconium alloy material is obtained by providing a zirconium alloy containing on the mass basis: 0.001% to 1.9% of Sn, 0.01% to 0.3% of Fe, 0.01% to 0.3% of Cr, 0.001% to 0.3% of Ni, 0.001% to 3.0% of Nb, 0.027% or less of C, 0.025% or less of N, 4.5% or less of Hf and 0.16% or less of O with the remainder being inevitable impurities and zirconium, being formed of a bulk alloy and a surface layer, in which the surface layer has a plastic strain of 3 or more or a Vickers hardness of 260 HV or more and an arithmetic mean surface roughness Ra of 0.2 μm or less.

17 Claims, 13 Drawing Sheets

(56) References Cited

U.S. PATENT DOCUMENTS

| | | | |
|---|---|---|---|
| 4,938,920 A * | 7/1990 | Garzarolli et al. | 420/422 |
| 4,963,316 A * | 10/1990 | Stehle et al. | 420/422 |
| 5,112,573 A * | 5/1992 | Foster et al. | 420/422 |
| 5,125,985 A * | 6/1992 | Foster et al. | 148/421 |
| 5,230,758 A * | 7/1993 | Foster et al. | 420/422 |
| 5,254,308 A * | 10/1993 | Garde et al. | 420/422 |
| 7,738,620 B2 | 6/2010 | Barberis et al. | |

FOREIGN PATENT DOCUMENTS

| | | |
|---|---|---|
| JP | 63-33535 | 2/1988 |
| JP | 64-039358 | 2/1989 |
| JP | 64-39589 | 2/1989 |
| JP | 2-271291 | 11/1990 |
| JP | 6-317687 | 11/1994 |
| JP | 2600057 | 1/1997 |
| JP | 10-73690 | 3/1998 |
| JP | 2790138 | 6/1998 |
| JP | 10-273746 | 10/1998 |
| JP | 10-339793 | 12/1998 |
| JP | 11-52087 | 2/1999 |
| JP | 11-101887 | 4/1999 |
| JP | 11-109072 | 4/1999 |
| JP | 2000-105289 | 4/2000 |
| JP | 2001-262259 | 9/2001 |
| JP | 2008-509281 | 3/2008 |
| JP | 2009-154209 | 7/2009 |
| JP | 2010-229507 | 10/2010 |

* cited by examiner 200 nm

ZIRCONIUM ALLOY MATERIAL

CLAIM OF PRIORITY

The present application claims priority from Japanese Patent application serial No. 2010-249543, filed on Nov. 8, 2010, the content of which is hereby incorporated by reference into this application.

BACKGROUND OF THE INVENTION

1. Field of the Invention

The present invention relates to a zirconium alloy material.

2. Description of Related Art

Zirconium alloys are used as materials for chemicals manufacturing apparatuses/devices due to their satisfactory corrosion resistance. In addition, zirconium alloys are used as materials for core internals of nuclear reactors such as fuel cladding tubes and channel boxes due to their small thermal neutron cross-sections.

For example, zirconium alloys each containing 1.2 to 1.7 percent by mass of tin (Sn) such as R60802 and R60804 alloys prescribed in American Society for Testing and Materials Standards (ASTM) B811, and ZrTN802D and ZrTN804D alloys prescribed in Japanese Industrial Standards (JIS) H4751 are used in nuclear fuel cladding tubes, spacers, and channel boxes of light-water reactors typified by pressurized water reactors and boiling water reactors. Independently, zirconium alloys each containing 2.0 to 3.0 percent by mass of niobium (Nb) such as R60901 alloy prescribed in ASTM B811 are used in pressure tubes typically of heavy-water reactors.

In use environments of materials for core internals, even zirconium alloy materials undergo corrosion which proceeds during a long-term use. This causes the zirconium alloy materials to have a thick film to thereby have a lower heat transfer coefficient.

In a fuel rod, the fracture of the cladding tube may occur because temperature rise of uranium pellets accelerates the emission of fission product gases (fission products (FPs) in a gaseous form) to increase the inner pressure of the cladding tube. In addition, progression of the corrosion may increase the amount of hydrogen absorption, and this may cause hydrogen embrittlement. For these reasons, the corrosion is considered to be one of factors which decide lives of instruments composed of the zirconium alloys.

Zirconium alloys for constituting such instruments are demanded to have further higher corrosion resistance so as to use the instruments for a long time. To meet this demand, improvements such as those in manufacturing process and in chemical composition have been investigated in order to improve the corrosion resistance of zirconium alloys.

In a zirconium alloy, there are an α-phase (hexagonal closest packing structure: HCP) region stable at room temperature; a β-phase region stable at high temperatures of about 950° C. or higher, of which transformation temperature may vary depending on the chemical composition; and an α+β phases region between these regions.

In a manufacturing process of a zirconium alloy material, a billet prepared through melting and subsequent forging is subjected to a solution heat treatment called β-quenching, in which the material is held in a single β-phase region and then quenched, in order to improve corrosion resistance and to homogenize the whole material. After the β-quenching, the zirconium alloy material is subjected to a hot working according to necessity, followed by repeating cold workings with the interposition of annealing operations in the α+β phases region or α-phase region to form the material into a predetermined shape of the target member. In the solution heat treatment, the zirconium alloy material may be held in the α+β phases region before quenching.

Sn-containing zirconium alloys undergo precipitation of intermetallic compounds such as $Zr(Cr,Fe)_2$ and $Zr_2(Ni,Fe)$. Nb-containing zirconium alloys undergo precipitation of β-zirconium or β-niobium. Nb-containing zirconium alloys further containing Sn and/or Fe undergo precipitation of intermetallic compounds such as $(Zr,Nb)_3Fe$, $(Zr,Nb)_2Fe$, $Zr(Fe,Nb)_2$ and $Zr(Fe,Nb)_3$. Formation and growth of these precipitates occurs during holding at high temperatures after β-quenching.

In thermoforming after β-quenching, working ratio and annealing conditions are controlled to be suitable conditions in consideration of the texture formation of alloy and the formation and growth of precipitates. The texture interacts typically with the irradiation growth and hydrogen embrittlement of the alloy, whereas the precipitates affect the corrosion resistance of the alloy. If the precipitates are coarsely grown, the corrosion resistance is adversely affected. To avoid this, the thermal history in thermoforming after β-quenching is controlled so as to avoid long-term holding of the alloy material at high temperatures.

β-quenching helps the alloy material to have better corrosion resistance if it is performed at a high cooling rate.

Japanese Unexamined Patent Application Publication No. 2001-262259 (Document 1) discloses a Sn-containing zirconium alloy in which liquid sodium is used instead of water as a cooling medium in β-quenching.

Japanese Unexamined Patent Application Publications No. S63-33535, No. S64-39589, No. H02-271291 and No. H10-273746 (Documents 2 to 5) disclose zirconium alloys each having a lower Sn content to suppress uniform corrosion to thereby improve corrosion resistance.

Japanese Patent No. 2600057 and Japanese Patent No. 2790138 (Documents 6 and 7) disclose Sn-containing zirconium alloys each having a higher Fe content and having a specific ratio of Fe content to Ni content in order to help the Sn-containing zirconium alloys to have better corrosion resistance.

Japanese Unexamined Patent Application Publications No. H11-101887 and No. H11-109072 (Documents 8 and 9) disclose Sn—Nb-containing zirconium alloys each including finely dispersed β-niobium grains having an average grain size of 30 to 150 nm. The zirconium alloys are obtained by performing a heat treatment at 540° C. for 16 hours after β-quenching, in order to provide high corrosion resistance even in an irradiation environment.

In a nuclear fuel cladding tube, an alloy material is generally subjected to final annealing in thermoforming, thereafter straightened using a roll straightener, and the outer surface of which is finished by mechanical polishing or acid pickling. Japanese Unexamined Patent Application Publications No. H11-52087 and No. 2000-105289 (Document 10 and 11) disclose zirconium alloy nuclear fuel cladding tubes which have been manufactured by performing shot peening on the surface and subsequently performing a heat treatment at 560° C. to 620° C. in final stages of their manufacturing, to form, in the outer surface, an ultrafine grain layer having an average grain size of 3 μm or less and a thickness of from 1 to 100 μm so as to improve corrosion resistance.

SUMMARY OF THE INVENTION

The present invention provides a zirconium alloy material, in which the zirconium alloy material has undergone a cold working at least in its surface layer so as to give a plastic strain of 3 or more or a Vickers hardness of 260 HV or more, and the surface of the cold-worked layer has been planarized by mechanical or chemical polishing while allowing the cold-worked layer to remain. The planarized surface preferably has a residual stress being compressive. The zirconium alloy material is formed of a bulk alloy and a surface layer, in which the surface layer has a plastic strain of 3 or more or a Vickers hardness of 260 HV or more and an arithmetic mean surface roughness Ra of 0.2 µm or less.

The present invention allows a zirconium alloy material to have more satisfactory corrosion resistance and thereby helps an instrument using the zirconium alloy material to have more satisfactory reliability and a longer life. In addition, the present invention provides a more efficient manufacturing process for such a zirconium alloy material by adopting the step according to the present invention in a final step of the manufacturing process so as to allow the zirconium alloy material to have higher corrosion resistance regardless of the thermal history during the forming step of the zirconium alloy material.

DETAILED DESCRIPTION OF THE PREFERRED EMBODIMENTS

Figure 1:
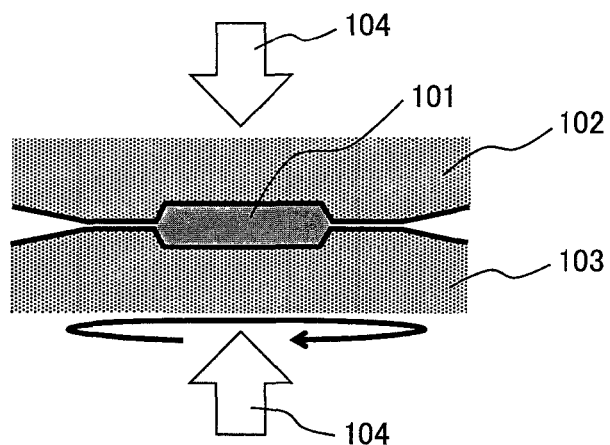
FIG. 1 is a cross-sectional view illustrating a principal part of a high-pressure twisting test apparatus used in consideration of conditions to be employed in the present invention.

The present invention relates to a method for manufacturing a novel zirconium alloy material. Specifically, the present invention relates to a zirconium alloy which is suitable for use as or in materials, instruments and structures requiring satisfactory corrosion resistance.

The present invention provides a zirconium alloy material having high corrosion resistance by applying a large plastic strain through a cold working (also called "large strain working") and subsequently performing a heat treatment and a surface polishing in an embodiment.

An object of the present invention is to provide a zirconium alloy material which is highly resistant to corrosion regardless of a thermal history during its manufacturing process.

A highly corrosion-resistant zirconium alloy material (highly corrosion-resistant zirconium alloy member) according to an embodiment of the present invention is a zirconium alloy containing Sn in a content of from 0.001% to 1.9%, Fe in a content of from 0.01% to 0.3%, Cr in a content of from 0.01% to 0.3%, Ni in a content of from 0.001% to 0.3%, Nb in a content of from 0.001% to 3.0%, C in a content of 0.027% or less, N in a content of 0.025% or less, Hf in a content of 4.5% or less and O in a content of 0.16% or less on the mass basis with the remainder being inevitable impurities and zirconium (Zr), in which the material has undergone cold working in at least its surface layer so as to give a plastic strain of 3 or more, and the surface of the cold-worked layer has been planarized through mechanical or chemical polishing while allowing the cold-worked layer to remain.

As used herein the term "large strain working" refers to such a cold working as to give a plastic strain of 3 or more.

Also as used herein the term "mechanical polishing" refers to a technique by which the surface to be polished is ground, polished, and thereby planarized using hard abrasive grains while reducing their grain sizes stepwise. The polishing operation may be performed while immersing the surface to be polished in a suitable solvent. The term "chemical polishing" refers to a technique by which a surface to be polished is ground and planarized by dissolving the surface with a chemical such as an acid.

As an intermediate technique between the mechanical and chemical polishing techniques, there is a polishing technique in which a surface to be polished is planarized by applying ion particles such as of argon to the surface. The term "mechanical or chemical polishing" as used herein also includes techniques of this kind.

In a preferred embodiment of the highly corrosion-resistant zirconium alloy material according to the present invention, the zirconium alloy has a nitrogen content of 0.008% or less and a hafnium content of 0.010% or less on the mass basis.

In another preferred embodiment, the highly corrosion-resistant zirconium alloy material has undergone, at least in its surface layer, a cold working so as to give a plastic strain of 3 or more; then has been subjected to a heat treatment at 250° C. to 550° C.; and thereafter the surface of the cold-worked layer has been planarized by mechanical or chemical polishing while allowing the cold-worked layer to remain.

In yet another embodiment of the highly corrosion-resistant zirconium alloy material, the surface planarized by mechanical or chemical polishing has a residual stress being compressive.

Instill another embodiment, a highly corrosion-resistant zirconium alloy material is obtained by subjecting the material to a plastic working at 550° C. or lower so as to give a plastic strain of less than 3, and thereafter planarizing a surface of a layer which has undergone the cold working so as to give a plastic strain of 3 or more by the mechanical or chemical polishing after the above heat treatment, while allowing the cold-worked layer to remain.

In another embodiment, a highly corrosion-resistant zirconium alloy material is obtained by heating again the material after the above plastic working to perform a heat treatment at 550° C. or lower, thereafter planarizing the surface of the layer which has undergone the cold working so as to give the plastic strain of 3 or more by the mechanical or chemical polishing, while allowing the cold-worked layer to remain.

A highly corrosion-resistant zirconium alloy material according to an embodiment of the present invention is usable as a component of a nuclear fuel cladding tube, a spacer or a channel box for use in a nuclear reactor fuel assembly.

The corrosion resistance, especially resistance to nodular corrosion which may occur particularly in boiling-water reactors, shows a correlation with the sizes and compositional ratios of precipitates. Specifically, the precipitates have smaller sizes and thereby the nodular corrosion is impeded with a decreasing temperature or a decreasing time of the thermal history after β-quenching. Independently, in thermoforming after β-quenching, the working ratio and annealing conditions are controlled to be appropriate so as to allow the material to show a suitable texture and suitable mechanical properties according to the intended use of the material. Accordingly, the adopted thermo-mechanical treatment conditions are set in consideration of corrosion resistance but are not optimized for corrosion resistance, and are limited in other properties because of the consideration of the corrosion resistance.

After intensive investigations, we have found that the precipitates are dissolved in the zirconium alloy matrix to form solutes by subjecting a zirconium alloy to a cold working with a large plastic strain; that such solutes are re-precipitated but are finely dispersed to have small grain sizes during annealing at 250° C. to 550° C.; and that the resulting zirconium alloy material including precipitates as solutes or as finely dispersed particles has corrosion resistance superior to that before cold working even when β-quenching is not performed. We have further found that a cold working so as to give a plastic strain of 3 or more should be applied to the zirconium alloy material to allow precipitates to be dissolved in the zirconium alloy matrix.

It is important for the improvement of corrosion resistance to polish through a mechanical or chemical technique and thereby planarize asperities caused by working, because such asperities may serve as origins of corrosion. In addition, the polishing mitigates a tensile residual stress formed during the working and allows the residual stress to be compressive. When the zirconium alloy material is used in a high-temperature water or another environment which absorbs hydrogen, the absorbed hydrogen precipitates as a plate-like hydride. If a tensile stress is applied in a direction in parallel with the surface upon temperature drop, the orientation of the hydride may direct toward the thickness direction, and this may cause hydrogen embrittlement. In contrast, when a compressive residual stress previously applied to the surface, it may cancel the tensile stress occurring upon the temperature drop and may thereby suppress the hydride from having an orientation in the thickness direction. The absorption of hydrogen which causes hydrogen embrittlement may be reduced by decreasing the nickel (Ni) content of the zirconium alloy, but this causes poor resistance to as the nodular corrosion etc. However, the Ni content can be decreased and thereby the hydrogen absorption is suppressed while maintaining satisfactory corrosion resistance by improving the corrosion resistance according to the above-mentioned technique.

All percentages (%) regarding the chemical composition herein are by mass.

Tin (Sn) acts as an α-phase stabilizer in the zirconium alloy and plays a role as a principal element to strengthen the alloy. From the viewpoint of corrosion resistance, it is believed that the Sn content is preferably minimized. If the zirconium alloy has a Sn content of more than 1.9%, it may show insufficient corrosion resistance contrarily. To avoid this, the zirconium alloy for use herein preferably has the Sn content of 1.9% or less.

Iron (Fe) is added to the zirconium alloy as an element to improve the corrosion resistance. The Fe content is determined according to the use environment in consideration of balance with chromium (Cr) and nickel (Ni) which are other elements improving the corrosion resistance. However, if the zirconium alloy has a Fe content of more than 0.3%, it may show insufficient corrosion resistance. To avoid this, the zirconium alloy for use herein preferably has a Fe content of 0.3% or less.

Chromium (Cr) is added to the zirconium alloy as an element to improve the corrosion resistance. The Cr content is determined according to the use environment in consideration of balance with Fe and Ni which are other elements improving the corrosion resistance. However, if the zirconium alloy has a Cr content of more than 0.3%, it may show insufficient corrosion resistance contrarily. To avoid this, the zirconium alloy for use herein preferably has a Cr content of 0.3% or less.

Nickel (Ni) is added to the zirconium alloy as an element to improve the corrosion resistance. The Ni content is determined according to the use environment in consideration of balance with Fe and Cr which are other elements improving the corrosion resistance. However, if the zirconium alloy has a Ni content of more than 0.3%, it may have insufficient corrosion resistance contrarily. To avoid this, the zirconium alloy for use herein preferably has a Ni content of 0.3% or less. The zirconium alloy more preferably has a Ni content of 0.08% or less because the amount of hydrogen absorption in an environment of the high-temperature water which affects or causes hydrogen embrittlement of the zirconium alloy can be reduced with a decreasing Ni content.

Niobium (Nb) is added to the zirconium alloy as an element for improving the corrosion resistance, for preventing the hydrogen absorption and for improving the strength. Even if Niobium is added in a content of several percentages, it contributes to sufficient neutron economy because of its small thermal neutron cross-section. However, if the zirconium alloy has a Nb content of more than 3.0%, it may show insufficient corrosion resistance. To avoid this, the zirconium alloy for use herein preferably has the Nb content of 3.0% or less.

Carbon (C) has high affinity for zirconium and readily forms a carbide therewith. This element helps the zirconium alloy to have higher mechanical strength through solid-solution strengthening. In contrast, if the zirconium alloy has a carbon content of more than 0.027%, it may show insufficient corrosion resistance. To avoid this, the zirconium alloy for use herein preferably has the carbon content of 0.027% or less.

Nitrogen (N) has high affinity for zirconium and thereby readily forms a nitride therewith. This element helps the zirconium alloy to have higher mechanical strength through solid-solution strengthening. However, if the zirconium alloy has a nitrogen content of more than 0.025%, it may show insufficient corrosion resistance. To avoid this, the zirconium alloy for use herein preferably has the nitrogen content of 0.025% or less. When adopted to a use environment requiring further higher corrosion resistance, the zirconium alloy more preferably has a nitrogen content of 0.008% or less.

Oxygen (O) has high affinity for zirconium and is taken into the zirconium alloy matrix in an amount of from about 0.06% to about 0.16% during a regular melting process. This element helps the zirconium alloy to have a higher mechanical strength through solid-solution strengthening, but if an oxygen is contained in a content of more than 0.16%, it may cause the zirconium alloy to show insufficient ductility/toughness. To avoid this, the zirconium alloy for use herein preferably has the oxygen content of 0.16% or less.

Hafnium (Hf) is contained as an impurity at refining of zirconium. The Hf content of the zirconium alloy for use herein is set to be 4.5% or less in accordance with the ASTM standard for zirconium alloys for regular use. When the zirconium alloy material is used as a material for core internals of nuclear reactors where a smaller thermal neutron cross-section is required, the zirconium alloy is desirably minimized in contamination of hafnium therein, because hafnium has a thermal neutron cross-section 600 times as large as that of zirconium. If the zirconium alloy has the Hf content of more than 0.010%, it may have insufficient neutron economy. For these reasons, the zirconium alloy for use herein preferably has the Hf content of 0.010% or less.

In such a zirconium alloy containing alloying elements in contents within the above ranges, elements added for improving corrosion resistance form precipitates. If the precipitates become coarse, they cause the zirconium alloy to have poor corrosion resistance. However, the zirconium alloy can give a highly corrosion-resistant zirconium alloy material by performing in at least its surface layer a cold working so as to give a plastic strain of 3 or more, and planarizing the surface of the cold-worked layer by mechanical or chemical polishing while allowing the cold-worked layer to remain.

When the zirconium alloy material satisfying the conditions is used as a component of an instrument, it may help the instrument to have higher corrosion resistance to thereby show higher reliability and a longer life. In addition, a more efficient manufacturing process is provided by adopting the step according to the present invention to a final step of the manufacturing process so as to allow a zirconium alloy material to have higher corrosion resistance regardless of the thermal history during the forming (shaping) step of the zirconium alloy material.

EXAMPLES

Table 1 shows chemical compositions of tested materials used in working examples according to the present invention. The Sn-containing zirconium alloys 1 and 2 are added with Fe, Cr and Ni for higher corrosion resistance. The Nb-containing zirconium alloy is added with Nb for higher corrosion resistance, for less hydrogen absorption, and for higher strength. Each of these materials had been subjected to solution heat treatment, hot rolling, shaping by cold rolling, and annealing heat treatment.

TABLE 1

| Tested materials | Chemical composition (percent by mass) | | | | | | | | | |
|---|---|---|---|---|---|---|---|---|---|---|
| | Zr | Sn | Fe | Ni | Cr | Nb | C | N | O | Hf |
| Sn-containing zirconium alloy 1 | remainder | 1.28 | 0.17 | 0.07 | 0.10 | 0.002 | 0.01 | 0.002 | 0.11 | <0.010 |
| Sn-containing zirconium alloy 2 | remainder | 1.37 | 0.16 | 0.002 | 0.11 | 0.001 | 0.01 | 0.002 | 0.10 | <0.010 |
| Nb-containing zirconium alloy | remainder | 0.002 | 0.10 | 0.003 | 0.01 | 2.48 | 0.01 | 0.003 | 0.10 | <0.010 |

FIG. 1 is a schematic cross-sectional view illustrating a principal part of a high-pressure twisting test apparatus used in consideration of conditions to be employed in the present invention.

The high-pressure twisting test apparatus illustrated in FIG. 1 is an apparatus for quantitatively handling an applied pressure (hydrostatic) and applied plastic strain upon considerations of working conditions to be employed in the present invention. A test piece 101 having a thickness of 0.85 mm and a diameter 10 mm was cut out from each tested material, and the test piece 101 was held between compression portions provided in an upper anvil 102 and a lower anvil 103, respectively, and one of the two anvils was rotated at a rate of 0.2 rpm with the application of a predetermined pressure 104. In this process, a shear strain y applied to the test piece 101 is represented by following Mathematical Expression (1):

$$\gamma = \frac{2\pi rN}{t} \quad (1)$$

In Mathematical Expression (1), "r" represents the distance from the center of rotation; "N" represents the number of revolutions; and "t" represents the gauge (thickness) upon the application of the pressure, i.e., 0.6 mm.

In the high-pressure twisting test, a very large strain can be applied, and a plastic strain is very large as compared to an elastic strain. Accordingly, a strain applied in this test was handled as a plastic strain. A plastic strain $\varepsilon_{eq}$ equivalent to the tensile plastic strain was calculated from the shear plastic strain y according to following Mathematical Expression (2):

$$\varepsilon_{eq} = \frac{1}{\sqrt{3}} \ln\left(\frac{2 + \gamma^2 + \gamma\sqrt{4 + \gamma^2}}{2}\right) \quad (2)$$

Figure 2:
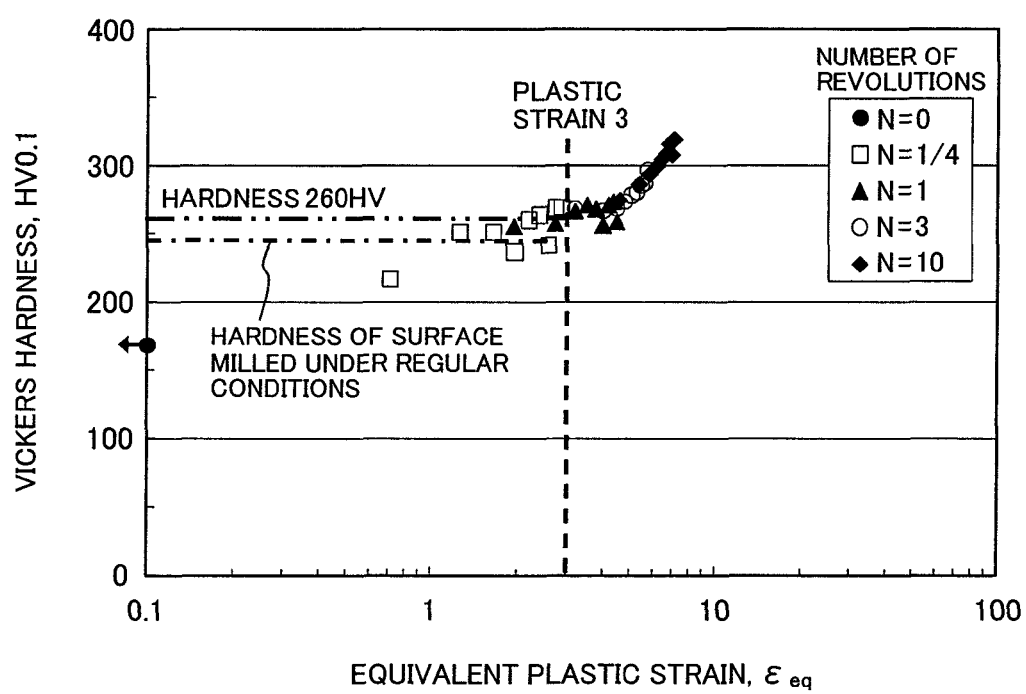
FIG. 2 is a graph illustrating how Vickers hardness of high-pressure twisted specimens varies depending on an equivalent plastic strain.

FIG. 2 is a graph showing how the Vickers hardness varies depending on the equivalent plastic strain after the Sn-containing zirconium alloy 1 in Table 1 is subjected to the high-pressure twisting under an applied pressure of 1.5 to 2.5 GPa.

The Vickers hardness herein was measured on a polished surface of the test piece and represents a Vickers hardness with respect to an equivalent plastic strain as calculated by Mathematical Expressions (1) and (2) according to the distance of each measurement position from the center of rotation.

Figure 3:
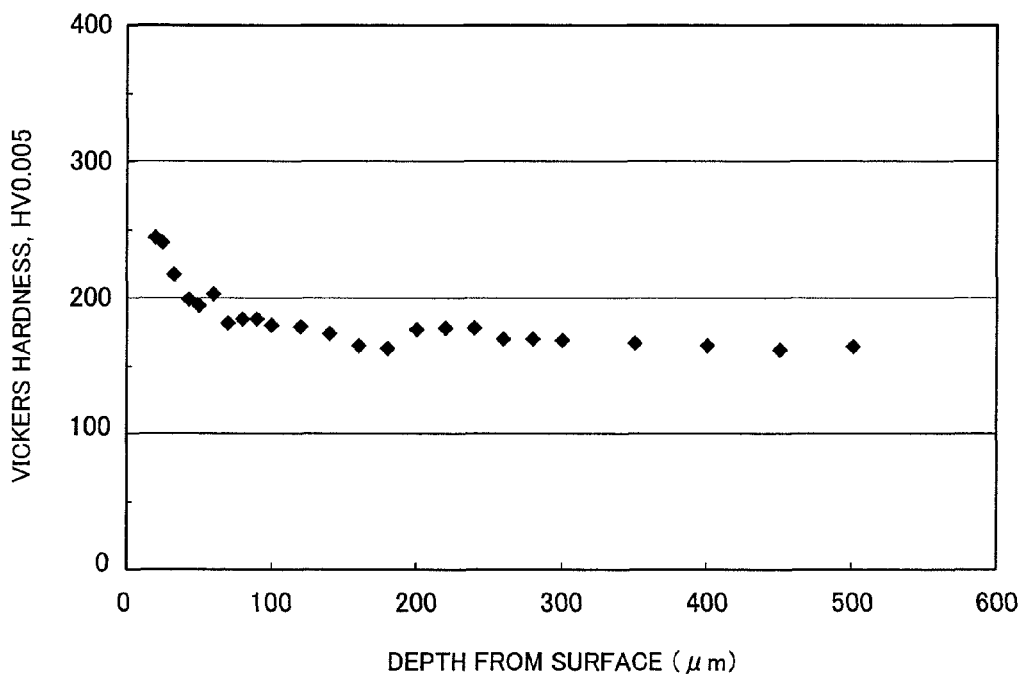
FIG. 3 is a graph illustrating how Vickers hardness in cross sections of a surface of a specimen which has undergone regular milling distributes in the depth direction.

FIG. 3 depicts how the cross-sectional Vickers hardness varies (distributes) depending on the depth, of a surface of the Sn-containing zirconium alloy 1 in Table 1 after grinding through a face milling under regular conditions.

A specimen after high-pressure twisting had a Vickers hardness which is higher than that of an unprocessed specimen by 100 HV or more and which is higher than the hardness in the vicinity of the surface of the specimen after regular milling. This is because the high-pressure twisting applies a large plastic strain to the specimen, whereas the surface of the regularly-milled specimen has a plastic strain not reaching the sufficient amount of plastic strain in the high-pressure twisted specimen as shown in FIG. 2.

Figure 4:
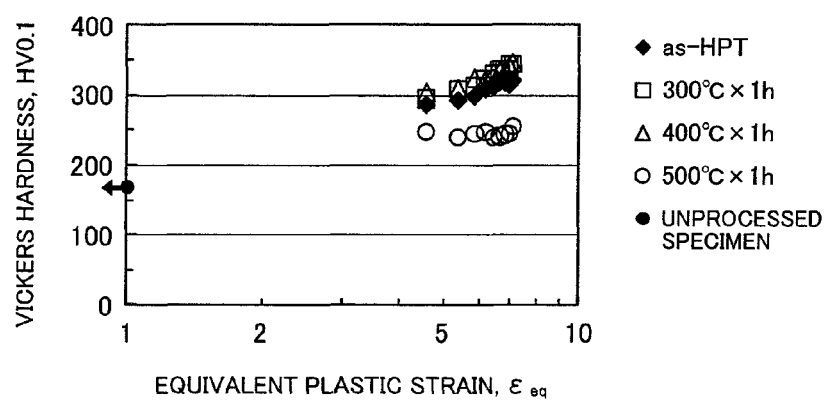
FIG. 4 is a graph illustrating how a heat treatment temperature affects the Vickers hardness of the high-pressure twisted specimens.

FIG. 4 shows the Vickers hardness of specimens derived from the Sn-containing zirconium alloy 1 in Table 1 after a high-pressure twisting at an applied pressure of 2.5 GPa and subsequent heat treatments at 300° C., 400° C. and 500° C. for 1 hour, respectively.

FIG. 4 demonstrates that the specimens each after a heat treatment at 400° C. or lower show little change in hardness as compared to that before the heat treatment. In contrast, the specimen after a heat treatment at 500° C. shows a lower hardness.

Figure 5A:
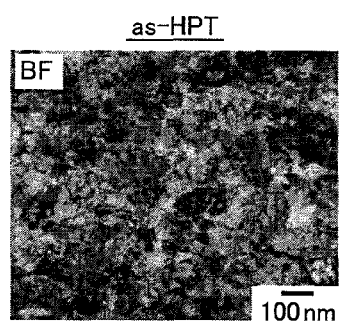
FIG. 5A depicts transmission electron microscopic images of a microstructure and an electron diffraction pattern of a high-pressure twisted specimen and a heat-treated specimen obtained therefrom.
Figure 5A:
Figure 5B:
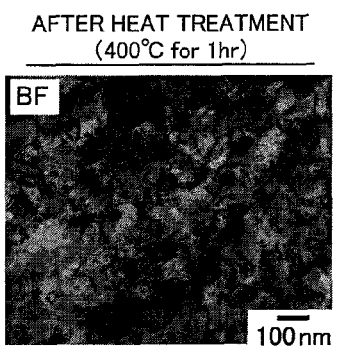
FIG. 5B depicts transmission electron microscopic images of a microstructure and an electron diffraction pattern of a high-pressure twisted specimen and a heat-treated specimen obtained therefrom.
Figure 5B:
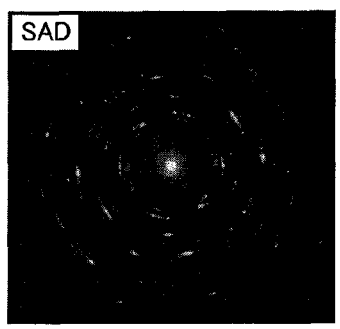
Figure 5C:
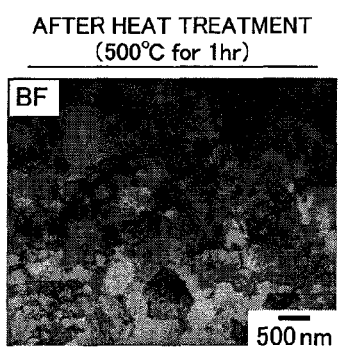
FIG. 5C depicts transmission electron microscopic images of a microstructure and an electron diffraction pattern of a high-pressure twisted specimen and a heat-treated specimen obtained therefrom.
Figure 5C:
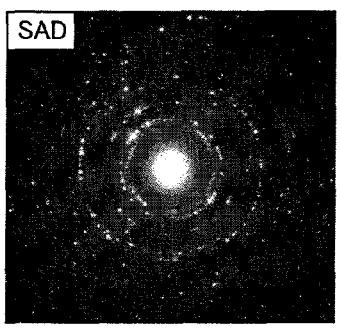

FIGS. 5A, 5B and 5C depict transmission electron microscopic bright field images and electron diffraction patterns of the high-pressure twisted specimen and heat-treated specimens obtained therefrom in FIG. 4. The specimen after high-pressure twisting without any further treatment (as-HPT) had a fine grain structure with a grain size of about 100 nm as its microstructure, and there was observed a zirconium α-phase alone but no precipitates in the diffraction pattern. This was true also for a region where the specimen had been treated with an equivalent plastic strain of 3 illustrated in FIG. 2.

The unprocessed specimen contained intermetallic compounds such as Zr (Cr, Fe)$_2$ and Zr$_2$(Ni, Fe) which are distributed as grains with grain sizes of 0.1 to 0.4 μm. Therefore, it indicates at least that most of intermetallic compounds precipitated as a result of cold working so as to give a plastic strain of 3 or more were dissolved in the zirconium alloy matrix. The 500° C.-heat-treated specimen contained large crystal grains in which intermetallic compounds of several nanometers to fifty nanometers were precipitated. The electron diffraction pattern also demonstrates the formation of intermetallic compounds. The 400° C.-heat-treated specimen showed a small number of spots in the electron diffraction pattern, which demonstrate the formation of the intermetallic compounds though it is not so clear as in the 500° C.-heat-treated specimen. This indicates that intermetallic compounds are precipitated in the specimen although they are in small amounts. The intermetallic compounds precipitated in the crystal grains by the heat treatment preferably have diameter of 50 nm or less, and more preferably have the diameter of 10 nm or less.

Figure 6A:
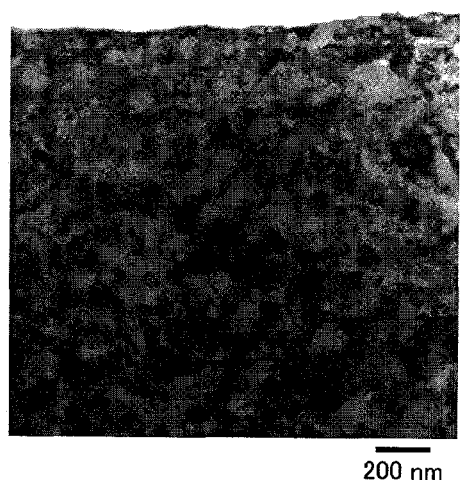
FIG. 6A depicts a transmission electron microscopic image of a microstructure of a cross-section of a surface layer of a specimen which has undergone regular milling (regular-milled specimen).
Figure 6B:
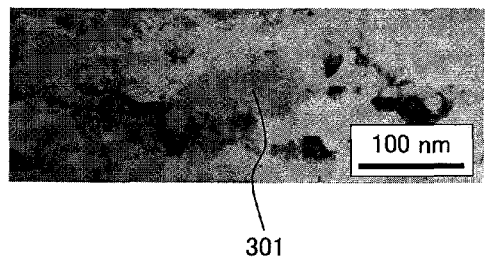
FIG. 6B depicts an enlarged image of FIG. 6A.

FIG. 6A depicts a transmission electron microscopic bright field image of the cross-section of the surface layer of a specimen whose surface has been milled under regular conditions. FIG. 6B depicts elements of FIG. 6A on larger scale.

The surface layer of this specimen shows a fine grain structure with grain sizes of several hundreds of nanometers as with the high-pressure twisted specimen in FIG. 5A, but includes amorphous grains (central part of FIG. 6B (amorphous grain 301)) having compositions as with those of intermetallic compounds. This demonstrates that the intermetallic compounds have become amorphous by the application of a large plastic strain but have not attained solid-solution in the zirconium alloy matrix.

If the amorphous grain 301 is exposed from the surface of a material, it may cause corrosion of the material.

Figure 7A:
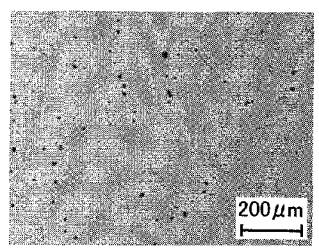
FIG. 7A depicts a backscattered electron image of the surface of an unprocessed specimen after immersion in a high-temperature water.
Figure 7B:
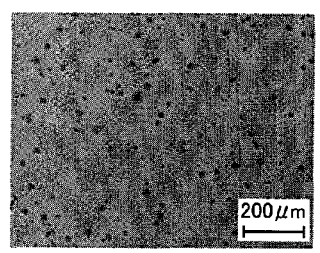
FIG. 7B depicts a backscattered electron image of the surface of a regular-milled specimen after immersion in a high-temperature water.
Figure 7C:
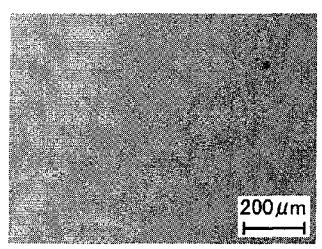
FIG. 7C depicts a backscattered electron image of the surface of a high-pressure twisted specimen after immersion in a high-temperature water.
Figure 7D:
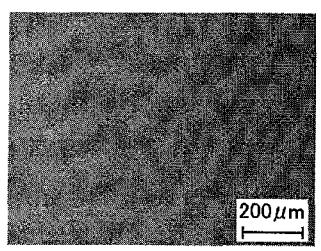
FIG. 7D depicts a backscattered electron image of the surface of a specimen obtained through high-pressure twisting and subsequent heat treatment at 300° C. after immersion in a high-temperature water.
Figure 7E:
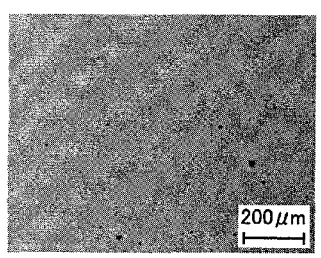
FIG. 7E depicts a backscattered electron image of the surface of a specimen obtained through high-pressure twisting and subsequent heat treatment at 400° C. after immersion in a high-temperature water.

FIGS. 7A, 7B, 7C, 7D and 7E depict backscattered electron images of surfaces of specimens observed after immersing in the high-temperature water having a dissolved oxygen concentration of 8 ppm at 288° C. for 1000 hours, on an unprocessed specimen (FIG. 7A), a regular-milled specimen (FIG. 7B), a high-pressure twisted specimen without any further treatment (as-HPT, FIG. 7C), a specimen obtained from the high-pressure twisted specimen after a heat treatment at 300° C. (FIG. 7D) and a specimen obtained from the high-pressure twisted specimen after a heat treatment at 400° C. (FIG. 7E).

The unprocessed specimen, high-pressure twisted specimen and heat-treated specimens obtained therefrom were prepared by mechanically polishing the surface and thereafter chemically polishing the surface with nitric hydrofluoric acid to thereby planarize the surface to an arithmetic mean surface roughness Ra of 0.2 μm or less. After the immersion in the high-temperature water, there were observed granular or nodular corrosion products on the surface. These were formed outside of a uniform oxide film about 1 μm thick present on the surface of the matrix. When the nodular corrosion product is analyzed on cross section, it was found to be a chromium oxide enriched with Fe and Ni, as with the intermetallic compounds, and the central area of the nodular corrosion product had relatively high concentrations of Fe, Ni and Cr. This demonstrates that the intermetallic compound or the amorphized product thereof exposed from the surface layer of the matrix serves as an origin of corrosion and causes the nodular corrosion product.

Figure 8:
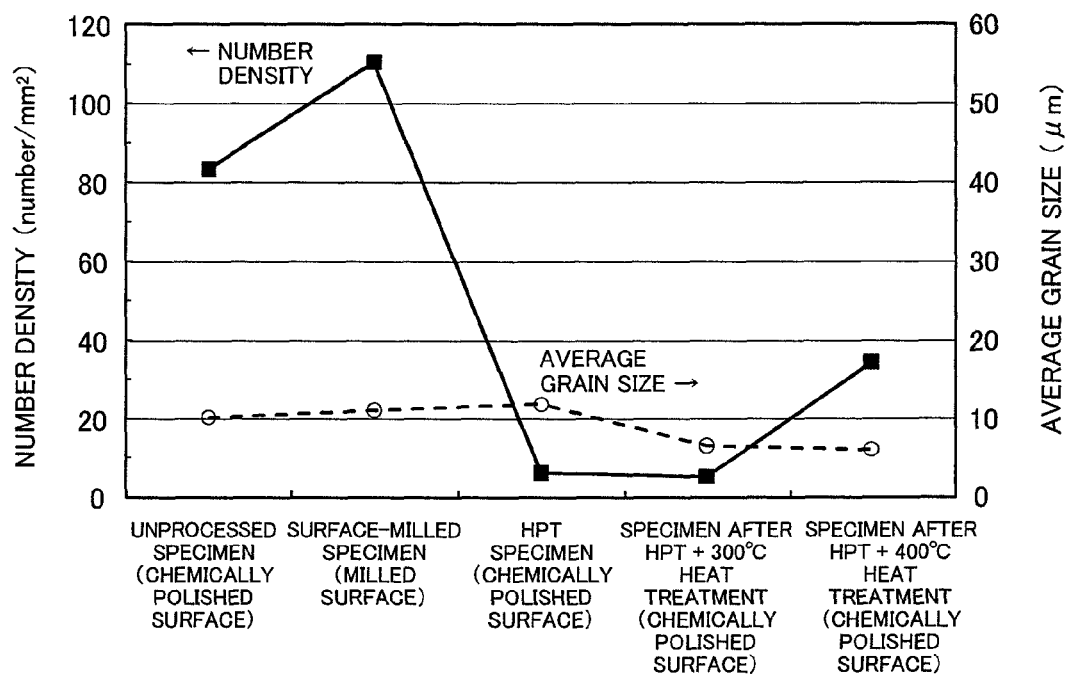
FIG. 8 is a graph showing the number density and average grain size of nodular corrosion products observed in the surface of respective specimens after immersion in a high-temperature water.

FIG. 8 shows the number density and average grain size of nodular corrosion products observed in the surfaces of the specimens after immersion in the high-temperature water. As used herein the term "number density" refers to a numerical value indicating the degree or magnitude of corrosion.

In the unprocessed specimen and the regular-milled specimen including the intermetallic compounds having grain sizes of 0.1 to 0.4 μm or amorphized products thereof, nodular corrosion products are observed as dispersed over the entire surface thereof. In contrast, in the specimen immediately after high-pressure twisting (as-HPT) and the specimen after heat treatment at 300° C. which are considered to have intermetallic compounds present in the form of solutes or slightly precipitated precipitates, the nodular corrosion products are hardly observed. In the 400° C.-heat-treated specimen in which the formation of the intermetallic compounds as a result of the heat treatment was observed, a number density of nodular corrosion products larger than that of the 300° C.-heat-treated specimen.

This demonstrates that the formation of nodular corrosion products is suppressed by performing a cold working so as to give a plastic strain of 3 or more and thereby allowing precipitated intermetallic compounds to be dissolved as solutes in the zirconium alloy matrix.

The unprocessed specimen of the Sn-containing zirconium alloy 2 in Table 1 includes intermetallic compounds such as $Zr(Cr, Fe)_2$ and $Zr_2(Ni, Fe)$ precipitated as grains with grain sizes of 0.1 to 0.4 μm. The unprocessed specimen of the Nb-containing zirconium alloy includes β-niobium precipitated as grains with grain sizes of 0.1 to 0.5 μm.

By subjecting these unprocessed specimens to a high-pressure twisting so as to give a plastic strain of 3 or more, the precipitates were dissolved in the zirconium matrix. When the resulting high-pressure twisted specimens were subjected to a heat treatment of 400° C. or higher, precipitates were re-precipitated. Regarding the resistance to corrosion caused by the high-temperature water, the as-HPT specimens and the specimens heat-treated at a temperature of up to 500° C. showed better corrosion resistance than that of the unprocessed specimen.

Next, the surface of a sample zirconium alloy plate was burnished by pressing a rotating tool thereto so as to allow the surface layer to undergo plastic flow, the resulting specimen was heat-treated at 300° C. for 1 hour, and finally subjected to mechanical polishing and subsequent chemical polishing to planarize asperities in the surface.

The surface layer had the Vickers hardness of 280 HV. A test piece sampled from the surface layer was immersed in the high-temperature water for 1000 hours and was found to have a number density of nodular corrosion products of only 6.2 per square millimeter.

Figure 9:
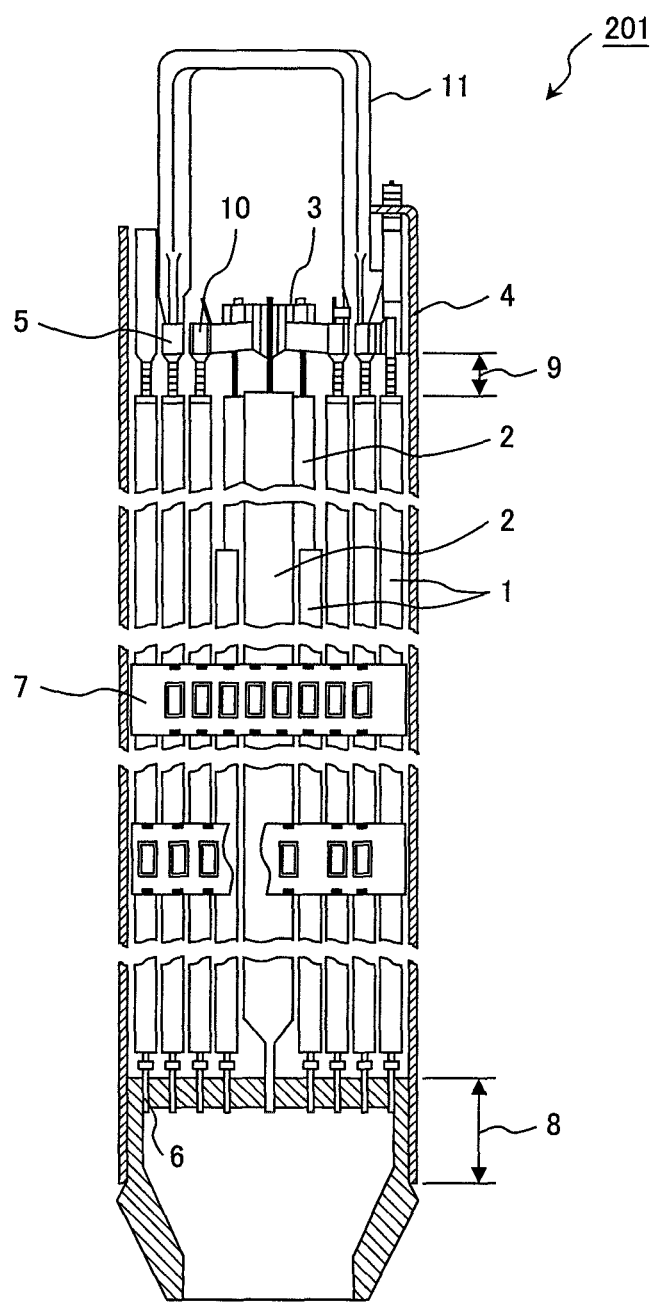
FIG. 9 is a cross-sectional view illustrating a fuel assembly according to an embodiment.

FIG. 9 depicts a fuel assembly using the zirconium alloy material according to the present invention.

With reference to FIG. 9, the fuel assembly 201 structurally includes a series of nuclear fuel rods 1 (nuclear fuel cladding tubes) and a series of water rods 2 tied as an arrayed bundle by the action of components such as an upper tie plate 5, a bottom tie plate 6, and spacers 7, where these components are covered by a channel box 4. The upper tie plate 5 has nuclear fuel rod through-holes 10 and water rod lockscrews 3. A handle 11 is attached to the top of the upper tie plate 5. A room 9 for nuclear fuel rod expansion is provided between the upper tie plate 5 and the nuclear fuel rods 1. A joint 8 of channel box and bottom tie plate is provided in a lower portion of the channel box 4.

Figure 10A:
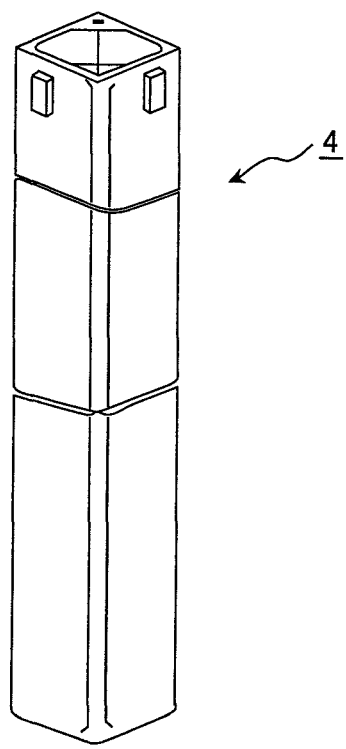
FIG. 10A is a perspective view illustrating a channel box according to an embodiment.
Figure 10B:
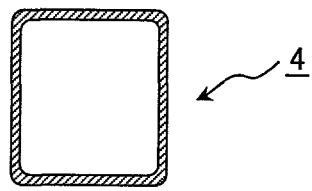
FIG. 10B is a cross-sectional view of the channel box of FIG. 10A.
Figure 11A:
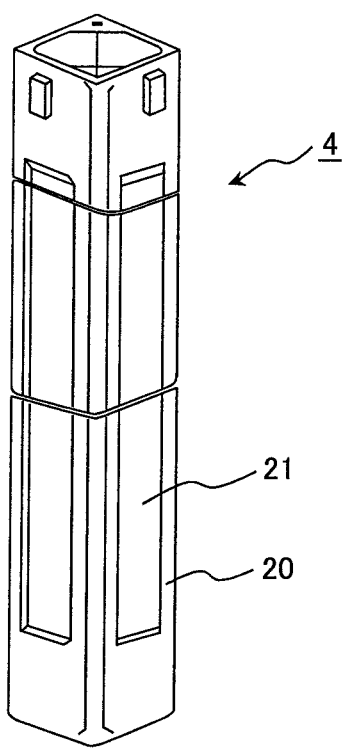
FIG. 11A is a perspective view illustrating a channel box according to another embodiment.
Figure 11B:
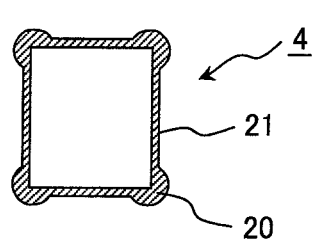
FIG. 11B is a cross-sectional view of the channel box of FIG. 10A.
Figure 11C:
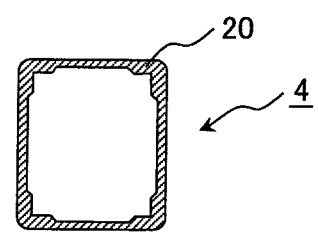
FIG. 11C is a cross-sectional view of the channel box of FIG. 10A.

FIGS. 10B, 11B and 11C are cross-sectional views illustrating channel boxes prepared according to the present invention.

Channel boxes 4 are in the form of quadrangular prisms.

The channel box 4 illustrated in FIGS. 10A and 10B has corner portions and side portions each having a substantially uniform thickness.

The channel box 4 illustrated in FIGS. 11A, 11B and 11C has side portions 21 and thick-wall corner portions 20.

Figure 12:
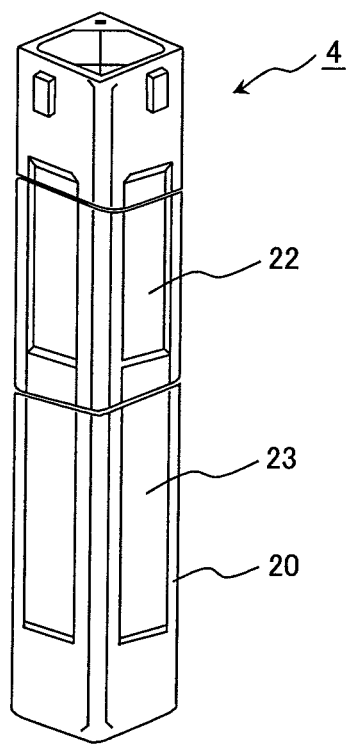
FIG. 12 is a perspective view illustrating a channel box according to another embodiment.

The channel box 4 illustrated in FIG. 12 has thick-wall corner portions 20, upper side portions 22 and lower side portions 23.

Figure 13:
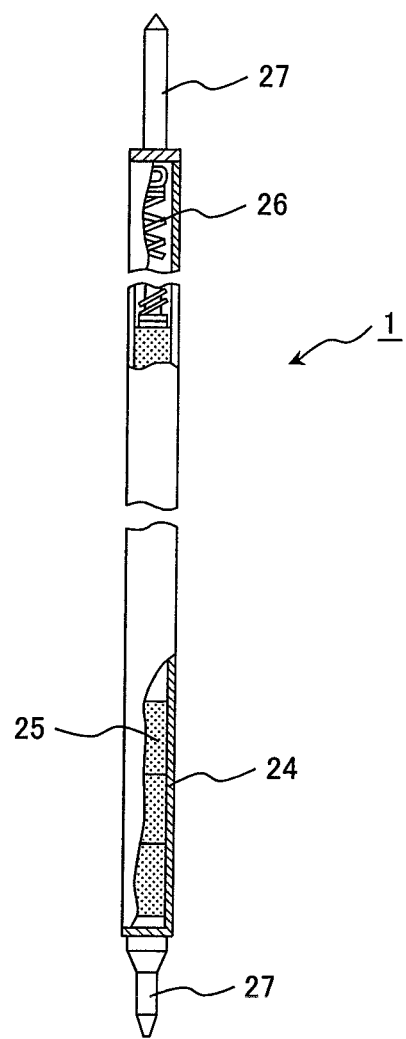
FIG. 13 is a local sectional view illustrating a nuclear fuel rod according to an embodiment.

FIG. 13 is a local sectional view illustrating a nuclear fuel rod prepared according to the present invention.

With reference to FIG. 13, the nuclear fuel rod 1 includes a cladding tube 24 housing nuclear fuel pellets 25. A plenum spring 26 is incorporated in an upper portion of the cladding tube 24. The both ends of the cladding tube 24 are sealed with end plugs 27.

Figure 14:
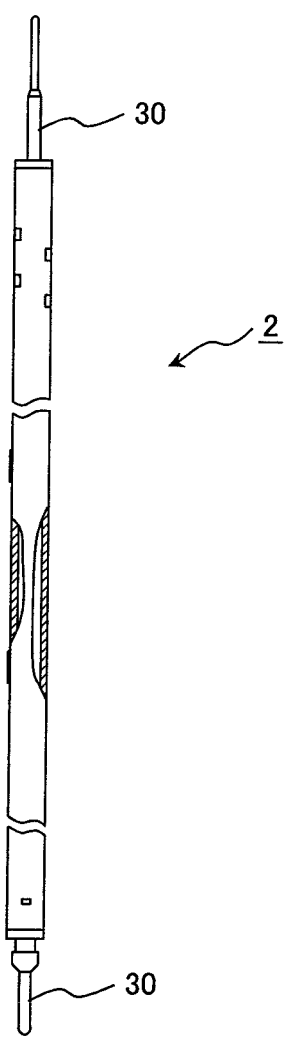
FIG. 14 is a local sectional view illustrating a water rod according to an embodiment.
Figure 15:
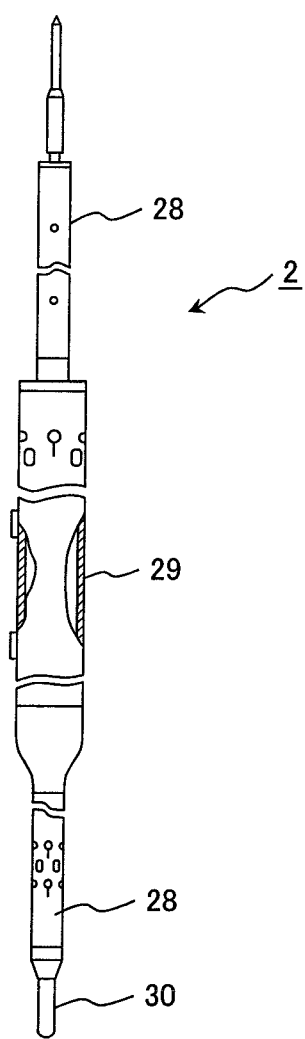
FIG. 15 is a local sectional view illustrating a water rod according to another embodiment.

FIGS. 14 and 15 are local sectional views illustrating water rods prepared according to the present invention.

The water rod 2 illustrated in FIG. 14 is in the form of a hollow cylinder having a uniform diameter, both ends of which are sealed with end plugs 30.

The water rod 2 illustrated in FIG. 15 has a large-diameter portion 29 at the central area and small-diameter portions 28 arranged on upper and lower sides thereof. The both ends of the water rod 2 are sealed with end plugs 30.

Figure 16:
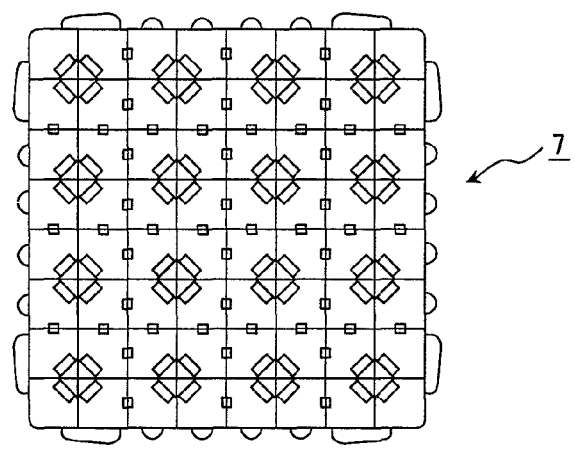
FIG. 16 is a top view illustrating a spacer according to an embodiment.
Figure 17:
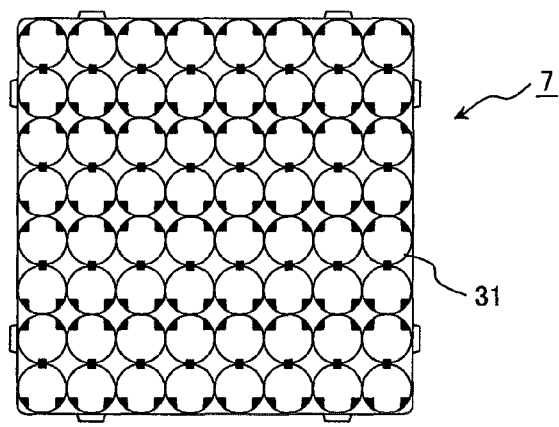
FIG. 17 is a top view illustrating a spacer according to another embodiment.

FIGS. 16 and 17 are top views of spacers prepared according to the present invention.

The spacer 7 illustrated in FIG. 17 is composed of a multiplicity of cells 31.

Figure 18:
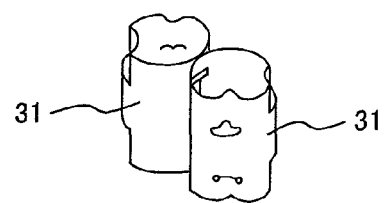
FIG. 18 is a perspective view illustrating cells 31 in FIG. 17.

FIG. 18 is an enlarged perspective view of cells constituting the spacer of FIG. 17.

With reference to FIG. 18, the cells 31 each have portions (recesses or openings) deformed so as to fit with each other.

Zirconium alloy materials according to embodiments of the present invention are applicable typically to chemicals manufacturing apparatuses/instruments, and core internals of nuclear reactors where satisfactory corrosion resistance is demanded.

What is claimed is:

1. A highly corrosion-resistant zirconium alloy material comprising a zirconium alloy containing on the mass basis:
    tin (Sn) in a content of 0.001% to 1.9%,
    iron (Fe) in a content of 0.01% to 0.3%,
    chromium (Cr) in a content of 0.01% to 0.3%,
    nickel (Ni) in a content of 0.001% to 0.3%,
    niobium (Nb) in a content of 0.001% to 3.0%,
    carbon (C) in a content of 0.027% or less,
    nitrogen (N) in a content of 0.025% or less,
    hafnium (Hf) in a content of 4.5% or less, and
    oxygen (O) in a content of 0.16% or less
    with the remainder being inevitable impurities and zirconium (Zr),
    wherein the zirconium alloy material includes a surface layer which provides a surface of the zirconium, alloy material,
    wherein the surface layer has a plastic strain of 3 or more or a Vickers hardness of 260 HV or more, and an arithmetic mean surface roughness Ra of said surface, of 0.2 μm or less, and
    wherein an intermetallic compound precipitated in a crystal grain in the surface layer has a diameter of 50 nm or less.

2. The highly corrosion-resistant zirconium alloy material according to claim 1, containing nitrogen (N) in a content of 0.008% or less and hafnium (Hf)) in a content of 0.010% or less.

3. The highly corrosion-resistant zirconium alloy material according to claim 1, wherein the zirconium alloy has undergone a cold working in said surface layer, thereby providing a cold-worked layer having a surface which is the same surface as the surface of the surface layer, and after the cold working has undergone a heat treatment at 250° C. to 550° C., and thereafter the surface of the cold-worked layer has been planarized by mechanical or chemical polishing while allowing the cold-worked layer to remain.

4. The highly corrosion-resistant zirconium alloy material according to claim 3, wherein the zirconium alloy after the heat treatment has undergone a plastic working at 550° C. or lower so as to give a plastic strain of less than 3, and thereafter the surface of the cold-worked layer has been planarized by mechanical or chemical polishing while allowing the cold-worked layer to remain.

5. The highly corrosion-resistant zirconium alloy material according to claim 4, wherein the zirconium alloy after the plastic working has been reheated to 550° C. or lower to undergo a further heat treatment, and thereafter the surface of the cold-worked layer has been planarized by mechanical or chemical polishing while allowing the cold-worked layer to remain.

6. The highly corrosion-resistant zirconium alloy material according to claim 1, wherein the surface which has been planarized by mechanical or chemical polishing has a residual stress which is compressive stress.

7. A nuclear fuel cladding tube, a spacer, or a channel box for use in a nuclear reactor fuel assembly, comprising the highly corrosion-resistant alloy material of claim 1.

8. A nuclear fuel cladding tube comprising the highly corrosion-resistant zirconium alloy material of claim 1.

9. A fuel-assembly spacer comprising the highly corrosion-resistant zirconium alloy material of claim 1.

10. A fuel-assembly channel box comprising the highly corrosion-resistant zirconium alloy material of claim 1.

11. A method for manufacturing a highly corrosion-resistant zirconium alloy material, the method comprising the steps of:
preparing a zirconium alloy containing on the mass basis: tin (Sn) in a content of 0.001% to 1.9%, iron (Fe) in a content of 0.01% to 0.3%, chromium (Cr) in a content of 0.01% to 0.3%, nickel (Ni) in a content of 0.001% to 0.3%, niobium (Nb) in a content of 0.001% to 3.0%, carbon (C) in a content of 0.027% or less, nitrogen (N) in a content of 0.025% or less, hafnium (Hf) in a content of 4.5% or less and oxygen (O) in a content of 0.16% or less with the remainder being inevitable impurities and zirconium (Zr);
performing a cold working on a surface layer of the zirconium alloy so as to provide te surface layer with a plastic strain of 3 or more or a Vickers hardness of 260 HV or more, and thereby forming a cold worked layer having a surface; and
planarizing the surface of the cold-worked layer by mechanical or chemical polishing while allowing the cold-worked layer to remain, so as to give a distribution of cross-sectional Vickers hardness depending on a depth of the surface layer.

12. The method according to claim 11, wherein the zirconium alloy contains nitrogen (N) in a content of 0.008% or less and hafnium (Hf) in a content of 0.010% or less.

13. The method according to claim 11, further comprising the step of subjecting the zirconium alloy material after the cold working to a heat treatment at 250° C. to 550° C., before the step of planarizing.

14. The method according to claim 13, further comprising the step of subjecting the zirconium alloy material after the heat treatment to a plastic working at 550° C. or lower so as to give a plastic strain of less than 3, before the step of planarizing.

15. The method according to claim 14, further comprising the step of re-heating the zirconium alloy material after the plastic working and performing a further heat treatment at 550° C. or lower on the material, before the step of planarizing.

16. The method according to claim 11, wherein the step of planarizing is performed so as to allow the surface planarized by mechanical or chemical polishing to have a residual stress which is a compressive stress.

17. The method according to claim 11, wherein said material is a nuclear fuel cladding tube, a spacer, or a channel box for use in a nuclear reactor fuel assembly.

* * * * *